(12) United States Patent
Berger et al.

(10) Patent No.: US 7,094,740 B2
(45) Date of Patent: *Aug. 22, 2006

(54) ZINC CORROSION PROTECTION AGENTS FOR TREATING GLASSWARE SURFACES

(75) Inventors: Patricia Sara Berger, Cincinnati, OH (US); Brian Xiaoqing Song, West Chester, OH (US); James Robert Schwartz, West Chester, OH (US); Robert William Corkery, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/964,008

(22) Filed: Oct. 12, 2004

(65) Prior Publication Data
US 2005/0153868 A1 Jul. 14, 2005

Related U.S. Application Data

(60) Provisional application No. 60/511,756, filed on Oct. 16, 2003.

(51) Int. Cl.
*C11D 7/12* (2006.01)

(52) U.S. Cl. ............... 510/220; 510/227; 510/223; 510/434; 510/474; 510/473; 510/485; 510/514; 510/521; 510/533

(58) Field of Classification Search ......... 510/220, 510/227, 223, 434, 474, 473, 485, 514, 521, 510/533
See application file for complete search history.

(56) References Cited

U.S. PATENT DOCUMENTS

| | | | | |
|---|---|---|---|---|
| 3,669,901 A | * | 6/1972 | Murray | 252/387 |
| 4,612,049 A | * | 9/1986 | Berner et al. | 106/14.13 |
| 4,908,148 A | * | 3/1990 | Caravajal et al. | 510/514 |
| 4,917,812 A | * | 4/1990 | Cilley | 510/227 |
| 4,933,101 A | * | 6/1990 | Cilley et al. | 510/222 |
| 5,803,990 A | * | 9/1998 | Mosser et al. | 148/261 |
| 6,074,464 A | * | 6/2000 | Eddinger et al. | 106/14.12 |
| 6,407,055 B1 | | 6/2002 | Bauer et al. | |
| 6,622,736 B1 | * | 9/2003 | Hahn | 134/25.2 |
| 6,774,096 B1 | * | 8/2004 | Paye | 510/130 |

FOREIGN PATENT DOCUMENTS

| | | |
|---|---|---|
| DE | 101 53 5555 A1 | 5/2003 |
| EP | 0 561 452 A1 | 9/1993 |
| WO | WO 03/104370 A1 | 12/2003 |

* cited by examiner

*Primary Examiner*—Charles Boyer
(74) *Attorney, Agent, or Firm*—Jeffrey V. Bamber; Laura R. Grunzinger

(57) ABSTRACT

Corrosion protection agents for treating glassware surfaces, for example dishes and glasses, especially corrosion protection agents comprising zinc-containing materials are provided. Treatment systems and composition of matter, which incorporate these corrosion protection agents, are also provided.

10 Claims, 2 Drawing Sheets

ZINC CORROSION PROTECTION AGENTS FOR TREATING GLASSWARE SURFACES

FIELD OF THE INVENTION

The present invention relates to corrosion protection agents for treating glassware surfaces, for example dishes and glasses, especially corrosion protection agents comprising zinc-containing materials. Treatment systems and composition of matter which incorporate these corrosion protection agents are also provided.

BACKGROUND

Automatic dishwashing detergents constitute a generally recognized distinct class of detergent compositions whose purpose can include breaking down and removing food soils; inhibition of foaming; promoting the wetting of wash articles in order to minimize or eliminate visually observable spotting and filming; removing stains such as might be caused by beverages such as coffee and tea or by vegetable soils such as carotenoid soils; preventing a buildup of soil films on wash ware surfaces; and reducing tarnishing of flatware without substantially etching or corroding or otherwise damaging the surfaces of glasses or dishes. The problem of glassware surface corrosion during washing the cycle in the automatic dishwashing process has long been known. Current opinion is that the problem is the result of two separate phenomena. On one hand, the high pH needed for cleaning causes silica hydrolysis. This dissolved silica/ate (together with silicates added purposely to prevent china and metal corrosion) deposit on the glassware surface leading to iridescence and clouding. On the other hand, builders cause corrosion. The builders will chelate metal ions on glassware surfaces, which results in metal ion leaching and renders a less durable and chemical resistant glass. After several washes in an automatic dishwashing appliance, both phenomena can cause significant corrosion damage to glassware surfaces such as cloudiness, scratches, and streaks that results in consumer dissatisfaction.

Most consumers agree that corrosion of glassware surfaces, resulting from use of automatic dishwashing (ADW) appliances, is one of their most serious unmet needs. One approach to reducing glassware surface corrosion is to provide corrosion protection agents comprising water-soluble metal salts (such as zinc salts of chloride, sulfate or acetate) to afford some measure of glassware surface protection. Another approach is reduce precipitate formation, caused by the introduction of soluble zinc salts in a high pH environment, by spraying a solution of the water-soluble zinc salt onto granular polyphosphate particles. Another approach is to combine soluble zinc and a chelant. Another approach is to use insoluble zinc salt to control the release of $Zn^{2+}$ ions in the rinse to avoid filming. Another approach is to provide an automatic dishwashing composition with a mixture of disilicate and metasilicate. Another approach is to provide an additive to an automatic dishwashing composition, such as, a copolymer of an organomineral siliconate, which is obtained by condensation polymerization of an alkali metal disilicate and an alkali metal siliconate. Another approach is to provide an alkali metal silicate partially substituted with calcium, magnesium, strontium or cerium as a counterion. Another approach is the use of metal salts, particularly of aluminum, wherein the metal salt is sequestered to form a metal salt-sequestrant complex, such as, an aluminum (III)-sequestrant complex. In yet another approach, a fast-dissolving aluminum salt is used but this aluminum salt is combined with greater than about 10 wt. % silicate in high alkalinity products.

Thus, while there are many approaches available, there is still a continuing need to develop alternative corrosion protection agents for treating glassware surfaces such that significant glasscare benefits are achieved yet the problem of glassware surface corrosion is reduced.

SUMMARY OF THE INVENTION

The present invention relates to domestic, institutional, industrial, and/or commercial corrosion protection agents, especially certain zinc-containing materials, such as, particulate zinc-containing materials (PZCMs) and zinc-containing layered materials (ZCLMs), for treating glassware surfaces. Corrosion protection agents can be used alone, or in combination with detergent compositions, or as part of a treatment system and/or as part of a composition of matter to reduce glassware surface corrosion in automatic dishwashing processes.

In accordance with one aspect, a corrosion protection agent for treating glassware surfaces is provided. The corrosion protection agent comprises: (a) an effective amount certain zinc-containing materials, such as, PZCMs and ZCLMs; and (b) optionally an adjunct ingredient.

In accordance with another aspect, a treatment system is provided. A corrosion protection agent comprising an effective amount of certain zinc-containing materials, such as, PZCMs and ZCLMs, can be part of the treatment system for reducing glassware surface corrosion in an automatic dishwashing appliance. In accordance with another aspect, a composition of matter is provided. The composition of matter comprises a wash liquor that comprises a corrosion protection agent comprising certain zinc-containing materials, such as, PZCMs and ZCLMs.

DRAWING DESCRIPTION

DETAILED DESCRIPTION

Figure 1:
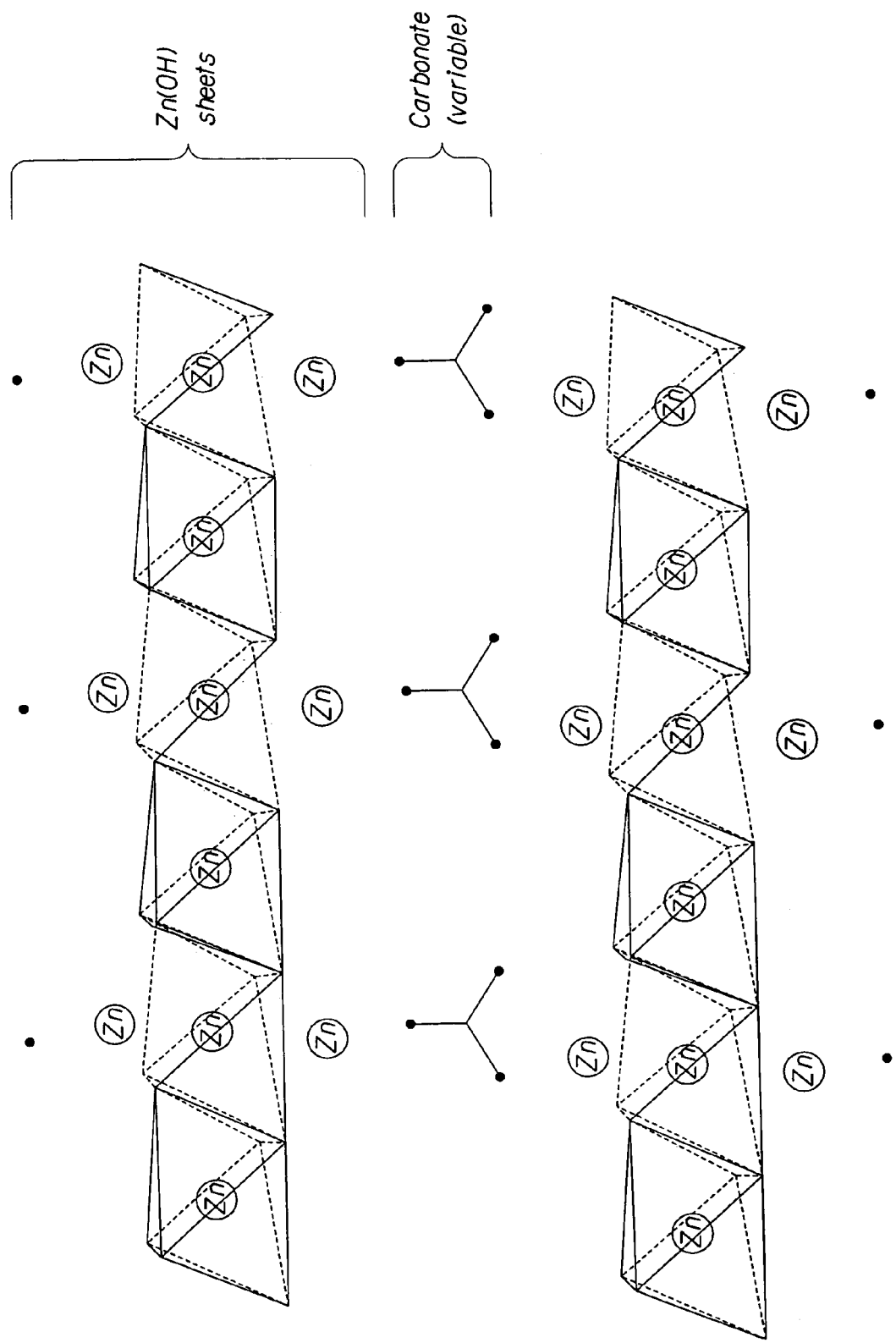
FIG. 1 represents the structure of a zinc-containing layered material.

It has surprisingly been found that glassware in automatic dishwashing can be protected by contacting glassware surfaces with corrosion protection agents containing certain zinc-containing materials, such as, particulate zinc-containing materials (PZCMs) and zinc-containing layered materials (ZCLMs). This is especially true in soft water conditions where chelating agents and builders can damage glassware by chelating metal ions in the glass structure itself. Thus, even in such harsh ADW environments, glass damage from surface corrosion can be reduced with the use of ZCLMs in ADW detergent compositions without the negative effects associated with the use of metal salts, such as: (a) increased cost of manufacture; (b) the need for higher salt levels in the formula due to poor solubility of the insoluble material; (c) the thinning of gel detergent compositions by interaction of the metal ions, for example $Al^{3+}$ ions and $Zn^+$ ions, with the thickener material; or (d) a reduction in the cleaning performance for tea, stains by interfering with the bleach during the entire wash cycle.

It has also surprisingly been found that the glass care benefit of the ZCLM is significantly enhanced when the ZCLM is dispersed prior to adding to or during the process of manufacturing the corrosion protection agent. Achieving good dispersion of the ZCLM particles in the corrosion protection agent significantly reduces agglomeration of the ZCLM particles in the wash liquor.

Any suitable corrosion protection agent may be used, alone or in combination with a composition of matter (such as the wash liquor), and/or as part of a treatment system comprising a kit having an effective amount of certain zinc-containing materials, such as, PZCMs and ZCLMs. By "effective amount" herein is meant an amount that is sufficient, under the comparative test conditions described herein, to reduce glassware surface corrosion damage on treated glassware through-the-wash.

Particulate Zinc-containing Materials (PZCMs)

Particulate zinc-containing materials (PZCMs) remain mostly insoluble within formulated compositions. Examples of PZCMs useful in certain non-limiting embodiments may include the following:

Inorganic Materials: zinc aluminate, zinc carbonate, zinc oxide and materials containing zinc oxide (i.e., calamine), zinc phosphates (i.e., orthophosphate and pyrophosphate), zinc selenide, zinc sulfide, zinc silicates (i.e., ortho- and meta-zinc silicates), zinc silicofluoride, zinc borate, zinc hydroxide and hydroxy sulfate, zinc-containing layered materials, and combinations thereof.

Natural Zinc-containing Materials/Ores and Minerals: sphalerite (zinc blende), wurtzite, smithsonite, franklinite, zincite, willemite, troostite, hemimorphite, and combinations thereof.

Organic Salts: zinc fatty acid salts (i.e., caproate, laurate, oleate, stearate, etc.), zinc salts of alkyl sulfonic acids, zinc naphthenate, zinc tartrate, zinc tannate, zinc phytate, zinc monoglycerolate, zinc allantoinate, zinc urate, zinc amino acid salts (i.e., methionate, phenylalinate, tryptophanate, cysteinate, etc), and combinations thereof.

Polymeric Salts: zinc polycarboxylates (i.e., polyacrylate), zinc polysulfate, and combinations thereof.

Physically Adsorbed Forms: zinc-loaded ion exchange resins, zinc adsorbed on particle surfaces, composite particles in which zinc salts are incorporated (i.e., as core/shell or aggregate morphologies), and combinations thereof.

Zinc Salts: zinc oxalate, zinc tannate, zinc tartrate, zinc citrate, zinc oxide, zinc carbonate, zinc hydroxide, zinc oleate, zinc phosphate, zinc silicate, zinc stearate, zinc sulfide, zinc undecylate, and the like, and combinations thereof.

Commercially available sources of zinc oxide include Z-Cote and Z-Cote HPI (BASF), and USP I and USP II (Zinc Corporation of America).

Physical Properties of PZCM Particles

Many benefits of using PZCMs in corrosion protection agents require that the $Zn^{2+}$ ion be chemically available without being soluble. This is termed "zinc lability". Certain physical properties of the PZCM have the potential to impact zinc lability. We have developed more effective corrosion protection agents based on optimizing PZCM zinc lability.

Some PZCM physical properties that can impact zinc lability may include, but are not limited to: crystallinity, surface area, and morphology of the particles, and combinations thereof. Other PZCM physical properties that may also impact zinc lability of PZCMs include, but are not limited to: bulk density, surface charge, refractive index, purity level, and combinations thereof.

Crystallinity

A PZCM having a less crystalline structure may result in a higher relative zinc lability. One can measure crystal imperfections or crystalline integrity of a particle by full width half maximum (FWHM) of reflections of an x-ray diffraction (XRD) pattern. Not wishing to be bound by theory, it is postulated that the larger the FWHM value, the lower the level of crystallinity in a PZCM. The zinc lability appears to increase as the crystallinity decreases. Any suitable PZCM crystallinity may be used. For example, suitable crystallinity values may range from about 0.01 to 1.00, or from about 0.1 to about 1.00, or form about 0.1 to about 0.90, or from about 0.20 to about 0.90, and alternatively, from about 0.40 to about 0.86 FWHM units at a 200 (~13° 2θ, 6.9 Å) reflection peak.

Particle Size

The PZCM particles in the corrosion protection agent may have any suitable average particle size. In certain non-limiting embodiment, it is has been found that a smaller particle size is directly proportional to an increase in relative zinc lability (%). Suitable average particle sizes include, but not limited to: a range of from about 10 nm to about 100 microns, or from about 10 nm to about 50 microns, or from about 10 nm to about 30 microns, or from about 10 nm to about 20 microns, or from about 10 nm to about 10 microns, and alternatively, from about 100 nm to about 10 microns. In another non-limiting embodiment, the PZCM may have an average particle size of less than about 15 microns, or less than about 10 microns, and alternatively less than about 5 microns.

Particle Size Distribution

Any suitable PZCM particle size distribution may be used. Suitable PZCM particle size distributions include, but are not limited to: a range from about 1 nm to about 150 microns, or from about 1 nm to about 100 microns, or from about 1 nm to about 50 microns, or from about 1 nm to about 30 microns, or from about 1 nm to about 20 microns, or from about 1 nm to about 10 microns, or from about 1 nm to about 1 micron, or from about 1 nm to about 500 nm, or from about 1 nm to about 100 nm, or from about 1 nm to about 50 nm, or from about 1 nm to about 30 nm, or from about 1 nm to about 20 nm, and alternatively, from about 1 nm or less, to about 10 nm.

Zinc-Containing Layered Materials (ZCLMs)

As already defined above, ZCLMs are a subclass of PZCMs. Layered structures are those with crystal growth primarily occurring in two dimensions. It is conventional to describe layer structures as not only those in which all the atoms are incorporated in well-defined layers, but also those in which there are ions or molecules between the layers, called gallery ions (A. F. Wells "Structural Inorganic Chemistry" Clarendon Press, 1975). For example, ZCLMs may have $Zn^{2+}$ ions incorporated in the layers and/or as more labile components of the gallery ions.

Many ZCLMs occur naturally as minerals. Common examples include hydrozincite (zinc carbonate hydroxide), basic zinc carbonate, aurichalcite (zinc copper carbonate hydroxide), rosasite (copper zinc carbonate hydroxide) and many related minerals that are zinc-containing. Natural ZCLMs can also occur wherein anionic layer species such as clay-type minerals (e.g., phyllosilicates) contain ion-exchanged zinc gallery ions. Other suitable ZCLMs include the following: zinc hydroxide acetate, zinc hydroxide chloride, zinc hydroxide lauryl sulfate, zinc hydroxide nitrate, zinc hydroxide sulfate, hydroxy double salts, and mixtures thereof. Natural ZCLMs can also be obtained synthetically or formed in situ in a composition or during a production process.

Hydroxy double salts can be represented by the general formula:

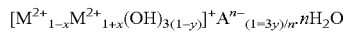

$$[M^{2+}_{1-x}M^{2+}_{1+x}(OH)_{3(1-y)}]^+A^{n-}_{(1=3y)/n}\cdot nH_2O$$

where the two metal ions may be different; if they are the same and represented by zinc, the formula simplifies to $[Zn_{1+x}(OH)_2]^{2x+}$ $2x$ $A^-.nH_2O$ (see Morioka, H., Tagaya, H., Karasu, M, Kadokawa, J, Chiba, K *Inorg. Chem.* 1999, 38, 4211–6). This latter formula represents (where x=0.4) common materials such as zinc hydroxychloride and zinc hydroxynitrate. These are related to hydrozincite as well, when a divalent anion replaces the monovalent anion.

Commercially available sources of zinc carbonate include zinc carbonate basic (Cater Chemicals: Bensenville, Ill., USA), zinc carbonate (Shepherd Chemicals: Norwood, Ohio, USA), zinc carbonate (CPS Union Corp.: New York, N.Y., USA), zinc carbonate (Elementis Pigments: Durham, UK), and zinc carbonate AC (Bruggemann Chemical: Newtown Square, Pa., USA).

The abovementioned types of ZCLMs represent relatively common examples of the general category and are not intended to be limiting as to the broader scope of materials that fit this definition.

Any suitable ZCLM in any suitable amount may be used. Suitable amounts of a ZCLM include, but are not limited to: a range: from about 0.001% to about 20%, or from about 0.001% to about 10%, or from about 0.01% to about 7%, and alternatively, from about 0.1% to about 5% by weight of the composition.

ZCLM Glass Network Strengthening Mechanism

It is well known that silica glass is a continuous three-dimensional (3D) network of corner-shared Si—O tetrahedra-lacking symmetry and periodicity (see W. H. Zachariasen, J. Am. Chem. Soc. 54, 3841, 1932). $Si^{4+}$ ions are network forming ions. At the vertex of each tetrahedron, and shared between two tetrahedra, is an oxygen atom known as a bridging oxygen.

Mechanical glass surface properties, such as chemical resistance, thermal stability, and durability, may depend on the glassware surface structure itself. Without wishing to bound by theory, it is believed that when some network forming positions are occupied by zinc compounds or $Zn^{2+}$ ions, the mechanical properties of the glassware surface structure improve (see G. Calas et al. C. R. Chimie 5 2002, 831–843).

FIG. 1 depicts a zinc-containing layered structure with crystal growth primarily occurring in two dimensions. $Zn^{2+}$ ions are incorporated in the layers and/or as more labile components of the gallery ions. For example, ZCLMs such as synthetic zinc carbonate hydroxide (ZCH) or natural-occurring hydrozincite (HZ), may have the formula:

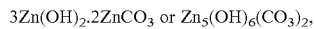

$$3Zn(OH)_2 \cdot 2ZnCO_3 \text{ or } Zn_5(OH)_6(CO_3)_2,$$

and consist of $Zn^{2+}$ ions forming brucite type hydroxide layers with some octahedral vacancies as shown in FIG. 1. Some of the $Zn^{2+}$ ions are positioned just above and below the vacant sites outside the hydroxide layers in tetrahedral (Td) coordination. Interlayer anions are weakly bound to the Td $Zn^{2+}$ ions completing the Td coordination. In the wash liquor, an ADW detergent composition with labile Td $Zn^{2+}$ ions is stable at the typical alkaline pH.

When a ZCLM is present in the wash water, the cationic charge on the brucite type hydroxide layers is the driving force for interaction with the negatively charged glass surface. This leads to efficient deposition of zinc compounds or $Zn^{2+}$ ions on the glass surface such that very low level of ZCLMs are needed to deliver a benefit. Once the brucite type hydroxide layers are placed in contact with the glass, zinc compounds or $Zn^{2+}$ ions can readily deposit on the glass and fill in the vacancies created by metal ion leaching and silica hydrolysis commonly occurring with ADW products. Thus, new zinc compounds or Zn2+ ions, introduced as glass network formers, strengthen the glass and prevent glass corrosion during further washes.

Corrosion Protection Agents and Compositions of Matter

At least some glassware surface corrosion protection is provided to glassware surfaces when treated with the corrosion protection agent during at least some portion of the wash cycle. In one non-limiting embodiment, a corrosion protection agent comprises an effective amount of a ZCLM, such that when the ZCLM is placed in contact with the glassware surface, an amount of zinc compounds or $Zn^{2+}$ ions is deposited on and/or within the imperfections or vacancies in the glassware surface. For example, the treated glassware surface may have zinc compounds or $Zn^{2+}$ ions present from about 1 nm up to about 1 micron, or from about 1 nm to about 500 nm, or from about 1 nm to about 100 nm, or from about 1 nm to about 50 nm, or from about 1 nm to about 20 nm, and alternatively, from about 1 nm to about 10 nm above and/or below the treated glassware surface.

In another non-limiting embodiment, a composition of matter comprises a wash liquor, which comprises a corrosion protection agent comprising an effective amount of a ZCLM, in an automatic dishwashing appliance during at least a part of the wash cycle, wherein from about 0.0001 ppm to about 100 ppm, or from about 0.001 ppm to about 50 ppm, or from about 0.01 ppm to about 30 ppm, and alternatively, from about 0.1 ppm to about 10 ppm of a ZCLM may be present in the wash liquor.

Any suitable pH in an aqueous corrosion protection agent containing a ZCLM may be used. In certain embodiments, a suitable pH may fall anywhere within the range of from about 6.5 to about 14. For example, certain embodiments of the corrosion protection agent have a pH of greater than or equal to about 6.5, or greater than or equal to about 7, or greater than or equal to about 9, and alternatively, greater than or equal to about 10.0.

Adjunct Ingredients

Any suitable adjunct ingredient in any suitable amount or form may be used. For a example, a detergent active and/or rinse aid active, adjuvant, and/or additive, may be used in combination with a ZCLM to form a composite corrosion protection agent. Suitable adjunct ingredients include, but are not limited to, cleaning agents, surfactant (for example, anionic, cationic, nonionic, amphoteric, zwitterionic, and mixtures thereof), chelating agent/sequestrant blend, bleaching system (for example, chlorine bleach, oxygen bleach, bleach activator, bleach catalyst, and mixtures thereof), enzyme (for example, a protease, lipase, amylase, and mixtures thereof), alkalinity source, water softening agent, secondary solubility modifier, thickener, acid, soil release polymer, dispersant polymer, thickeners, hydrotrope, binder, carrier medium, antibacterial active, detergent filler, abrasive, suds suppressor, defoamer, anti-redeposition agent, threshold agent or system, aesthetic enhancing agent (i.e., dye, colorants, perfume, etc.), oil, solvent, and mixtures thereof.

Dispersant Polymer

Any suitable dispersant polymer in any suitable amount may be used. Unsaturated monomeric acids that can be polymerized to form suitable dispersant polymers (e.g. homopolymers, copolymers, or terpolymers) include acrylic acid, maleic acid (or maleic anhydride), fumaric acid, itaconic acid, aconitic acid, mesaconic acid, citraconic acid and methylenemalonic acid. The presence of monomeric segments containing no carboxylate radicals such as methyl vinyl ether, styrene, ethylene, etc. may be suitable provided that such segments do not constitute more than about 50% by weight of the dispersant polymer. Suitable dispersant polymers include, but are not limited to those disclosed in U.S. Pat. Nos. 3,308,067; 3,308,067; and 4,379,080.

Substantially non-neutralized forms of the polymer may also be used in the corrosion protection agents. The molecular weight of the polymer can vary over a wide range, for instance from about 1000 to about 500,000, alternatively from about 1000 to about 250,000. Copolymers of acrylamide and acrylate having a molecular weight of from about 3,000 to about 100,000, or from about 4,000 to about 20,000, and an acrylamide content of less than about 50%, and alternatively, less than about 20%, by weight of the dispersant polymer can also be used. The dispersant polymer may have a molecular weight of from about 4,000 to about 20,000 and an acrylamide content of from about 0% to about 15%, by weight of the polymer. Suitable modified polyacrylate copolymers include, but are not limited to the low molecular weight copolymers of unsaturated aliphatic carboxylic acids disclosed in U.S. Pat. Nos. 4,530,766, and 5,084,535; and European Patent No. 0,066,915.

Other suitable dispersant polymers include polyethylene glycols and polypropylene glycols having a molecular weight of from about 950 to about 30,000, which can be obtained from the Dow Chemical Company of Midland, Mich. Such compounds for example, having a melting point within the range of from about 30° C. to about 100° C. can be obtained at molecular weights of 1450, 3400, 4500, 6000, 7400, 9500, and 20,000. Such compounds are formed by the polymerization of ethylene glycol or propylene glycol with the requisite number of moles of ethylene or propylene oxide to provide the desired molecular weight and melting point of the respective and polypropylene glycol. The polyethylene, polypropylene and mixed glycols are referred to using the formula:

wherein m, n, and o are integers satisfying the molecular weight and temperature requirements given above.

Suitable dispersant polymers also include the polyaspartate, carboxylated polysaccharides, particularly starches, celluloses and alginates, described in U.S. Pat. No. 3,723,322; the dextrin esters of polycarboxylic acids disclosed in U.S. Pat. No. 3,929,107; the hydroxyalkyl starch ethers, starch esters, oxidized starches, dextrins and starch hydrolysates described in U.S. Pat. No. 3,803,285; the carboxylated starches described in U.S. Pat. No. 3,629,121; and the dextrin starches described in U.S. Pat. No. 4,141,841. Suitable cellulose dispersant polymers, described above, include, but are not limited to: cellulose sulfate esters (for example, cellulose acetate sulfate, cellulose sulfate, hydroxyethyl cellulose sulfate, methylcellulose sulfate, hydroxypropylcellulose sulfate, and mixtures thereof), sodium cellulose sulfate, carboxymethyl cellulose, and mixtures thereof.

In certain embodiments, a dispersant polymer may be present in an amount in the range from about 0.01% to about 25%, or from about 0.1% to about 20%, and alternatively, from about 0.1% to about 7% by weight of the composition.

Carrier Medium

Any suitable carrier medium in any suitable amount in any suitable form may be used. Suitable carrier mediums include both liquids and solids depending on the form of the corrosion protection agent desired. A solid carrier medium may be used in dry powders, granules, tablets, encapsulated products, and combinations thereof. Suitable solid carrier mediums include, but are not limited to carrier mediums that are non-active solids at ambient temperature. For example, any suitable organic polymer, such as polyethylene glycol (PEG), may be used. In certain embodiments, the solid carrier medium may be present in an amount in the range from about 0.01% to about 20%, or from about 0.01% to about 10%, and alternatively, from about 0.01% to about 5% by weight of the composition.

Suitable liquid carrier mediums include, but are not limited to: water (distilled, deionized, or tap water), solvents, and mixtures thereof. The liquid carrier medium may be present in an amount in the range from about 1% to about 90%, or from about 20% to about 80%, and alternatively, from about 30% to about 70% by weight of the aqueous composition. The liquid carrier medium, however, may also contain other materials which are liquid, or which dissolve in the liquid carrier medium at room temperature, and which may also serve some other function besides that of a carrier. These materials include, but are not limited to: dispersants, hydrotropes, and mixtures thereof.

The corrosion protection agent can be provided in a "concentrated" system. For example, a concentrated liquid composition may contain a lower amount of a suitable carrier medium, compared to conventional liquid compositions. Suitable carrier medium content of the concentrated system may be present in an amount from about 30% to about 99.99% by weight of the concentrated composition. The dispersant content of the concentrated system may be present in an amount from about 0.001% to about 10% by weight of the concentrated composition.

Product Form

Any suitable product form may be used. Suitable product forms include, but not limited to: solids, granules, powders, liquids, gels, pastes, semi-solids, tablets, water-soluble pouches, and combinations thereof. The corrosion protection agent may also be packaged in any suitable form, for example, as part of a treatment system comprising a kit, which may comprise (a) a package; (b) an effective amount of a zinc-containing layered material; (c) optionally, an adjunct ingredient; and (d) instructions for using the corrosion protection agent to reduce glassware surface corrosion. The corrosion protection agent, as part of the treatment system, may be formulated in a single- and/or multi-compartment water-soluble pouch so that negative interactions with other components are reduced.

The corrosion protection agent suitable for use herein can be dispensed from any suitable device, including but not limited to: dispensing baskets or cups, bottles (pump assisted bottles, squeeze bottles, etc.), mechanic pumps, multi-compartment bottles, capsules, multi-compartment capsules, paste dispensers, and single- and multi-compartment water-soluble pouches, and combinations thereof. For example, a multi-phase tablet, a water-soluble or water-dispersible pouch, and combinations thereof, may be used to deliver the corrosion protection agent to any suitable solution or substrate. Suitable solutions and substrates include but are not limited to: hot and/or cold water, wash and/or rinse liquor, hard surfaces, and combinations thereof. The multi-phase product may be contained in a single or multi-compartment, water-soluble pouch. In certain embodiments, a corrosion protection agent may comprise a unit dose which allows for the controlled release (for example delayed, sustained, triggered, or slow release). The unit dose may be provided in any suitable form, including but not limited to: tablets, single- and multi-compartment water-soluble pouch, and combinations thereof. For example, the corrosion protection agent may be provided as a unit dose in the form of a multi-phase product comprising a solid (such as a granules or tablet) and a liquid and/or gel separately provided in a multi-compartment water-soluble pouch.

Process of Manufacture

Any suitable process having any number of suitable process steps may be used to manufacture the corrosion protection agents described herein in any suitable form (e.g. solids, liquids, gels). The corrosion protection agent may be formulated with any suitable amount of ZCLM in any suitable form either alone or in combination with an adjunct ingredient. The ZCLM that may be nonfriable, water-soluble or water-dispersible and/or may dissolve, disperse and/or melt in a temperature range of from about 20° C. to about 70° C. The corrosion protection agent may be manufactured in the form of a powder, granule, crystal, core particle, aggregate of core particles, agglomerate, particle, flake, extrudate, prill, or as a composite (e.g. in the form of a composite particle, flake, extrudate, prill), and combinations thereof.

A composite corrosion protection agent in the form of a composite particle, prill, flake and/or extrudate may be made separately by mixing raw ZCLM particles in powder form with the desired adjunct ingredient (such as, surfactant, dispersant polymer and/or carrier medium) in any order. Using the composite corrosion protection agent tends to reduce segregation. Thus, the tendency of the corrosion protection agent to settle or agglomerate in the final product is decreased. Furthermore, an enhancement of the dispersion of ZCLM particles in the wash liquor is observed once the composite corrosion protection agent is delivered during the wash cycle. It has also been observed that by delivering an increased dispersion of the ZCLM particles in the wash liquor, a significant improvement in the glasscare surface corrosion protection performance occurs when compared to using the corrosion protection agent comprising raw ZCLM particles, at equal levels, without incorporating an adjunct ingredient.

When the above-mentioned composite corrosion protection agent comprises a one or more carrier components, the carrier component(s) may be heated to above their melting point before adding the desired components (such as for example, a ZCLM, and/or an adjunct ingredient). Carrier components suitable for preparing a solidified melt are typically non-active components that can be heated to above melting point to form a liquid, and are cooled to form an intermolecular matrix that can effectively trap the desired components.

The corrosion protection agent can also be incorporated into a powder, granule, tablets and/or solids placed in water-soluble pouch formulations by spraying a liquid corrosion protection agent (such as a mixture of ZCLM and a liquid carrier) onto the desired components, for example, solid base detergent granules. The liquid carrier can be, for example, water, solvent, surfactant, and/or any other suitable liquid whereby the corrosion protection agent can be dispersed. The above-mentioned spraying step may occur at any suitable time during the corrosion protection agent manufacturing process.

In certain embodiments, by directly mixing and/or dispersing raw ZCLM particles into a liquid carrier or composition, a liquid corrosion protection agent can be made. The ZCLM can be dispersed into water (and/or solvent) prior to the addition of other desired components. When a liquid corrosion protection agent is placed in a dispenser, such as a bottle or water-soluble pouch, sufficient dispersion of the ZCLM can be achieved in the liquid by stabilizing the corrosion protection agent in the composition, either alone or in combination with a suitable adjunct ingredient, without the need to make the above-mentioned composite particle, prill, flake and/or extrudate.

Another non-limiting embodiment comprises the process steps of forming a molten corrosion protection agent by mixing an effective amount of ZCLM into a molten carrier medium (such as polyethylene glycol). This molten corrosion protection agent may then be sprayed, for example, onto granules, powders and/or tablets if desired.

Another non-limiting embodiment is directed to process of forming a solid corrosion protection agent. This is use for granules, powders, tablets, and/or solids placed in water-soluble pouches. The process allows the above-described molten corrosion protection agent to cool to a solid before grinding to a desired particle size and form (such as, a composite particle, prill, or flake). Optionally, one or more adjunct ingredients may be added in any amount, form, or order to the molten carrier medium before the cooling step. The molten mixture can also be extruded to form an extrudate composite, then cooled and ground to a desired form and particle size, if necessary, and mixed as described above. These ground mixtures form the desired corrosion protection agent, and can be delivered for use in any number of applications (i.e. alone or in combination with ADW detergent compositions) in any one or more of the above-mentioned forms to promote optimized corrosion protection performance on treated glassware surfaces.

Test Results

Figure 2:
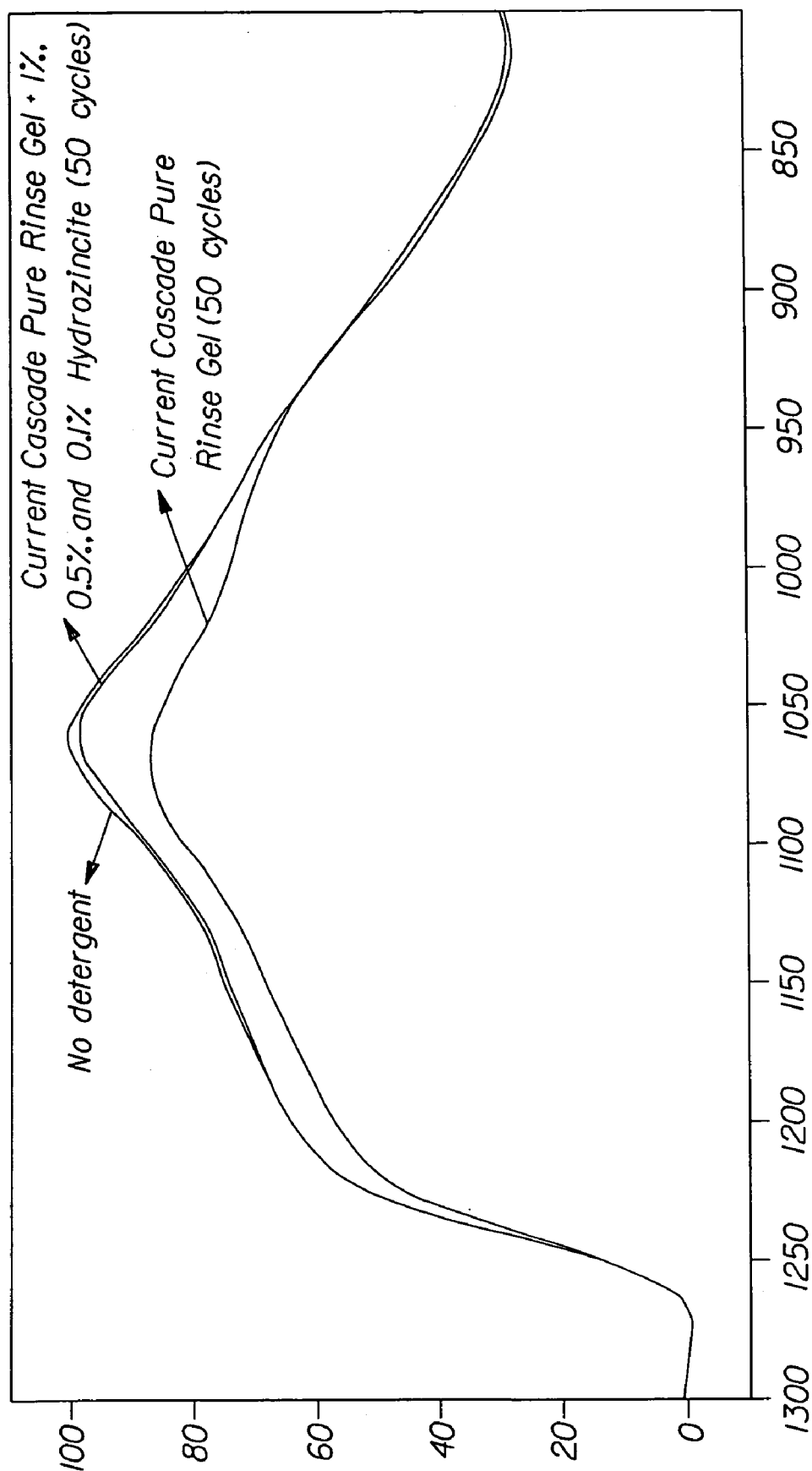
FIG. 2 represents a comparison of glassware surface strength using specular reflection IR.

The results of various tests on corrosion protection agents are presented in Tables I–IX and in FIG. 2. The luminescence and etching tests are run under the same conditions using the same or similar substrates (e.g. glasses, glass slides, and/or plates) unless otherwise noted. In each test, the substrate is washed for 50 to 100 cycles in a General Electric Model GE2000 automatic dishwasher under the following washing conditions: 0 gpg water—130° F., regular wash cycle, with the heated dry cycle turned on. On the top rack of the GE 2000, the following substrates are placed: four (4) Libbey 53 non-heat treated 10 oz. Collins glasses; three (3) Libbey 8564SR Bristol Valley 8½ oz. White Wine Glasses; three (3) Libbey 139 13 oz. English Hi-Ball Glasses; three (3) Luminarc Metro 16 oz. Coolers or 12 oz. Beverage glasses (use one size only per test); one (1) Longchamp Cristal d'Arques 5¾ oz. wine glass; and one (1) Anchor Hocking Pooh (CZ84730B) 8 oz. juice glass (when there are 1 or more designs per box use only one design per test). On the bottom rack of the GE 2000, the following substrates are placed: two (2) Libbey Sunray No.15532 dinner plates 9¼ in.; and two (2) Gibson black stoneware dinner plates #3568DP (optional—if not used replace with 2 ballast dinner plates).

All the glasses and/or plates are visually graded for iridescence after washing and drying using a 1–5 grading scale (outlined below). All the glasses and/or plates are also visually graded for evidence of etching using the same 1–5 grading scale used in the iridescence test. The values of grading scale are as follows: "1" indicates very severe damage to the substrate; "2" indicates severe damage to the substrate; "3" indicates some damage to the substrate; "4" indicates very slight damage to the substrate; and "5" indicates no damage to the substrate.

The luminescence test results are shown in Tables I–III and represent a comparison of substrate iridescence. The etching test results are shown in Tables IV–VII represent a comparison of etching grades. The x-ray photoelectron spectroscopy (XPS) test results are shown in Table VII and represent a comparison of zinc compound or $Zn^{2+}$ ion deposition on substrates using hydrozincite.

TABLE I

Iridescence of glassware substrates washed 100 cycles with liquid gel products:

| Substrate | Liquid Gel without HZ | Liquid Gel with 0.1% HZ |
|---|---|---|
| Libbey 53 (avg. of 4 glasses) | 1 | 5 |
| B. Valley wine (avg. of 3 glasses) | 1 | 5 |
| Luminarc (avg. of 3 glasses) | 1 | 5 |
| LC Wine (1 glass) | 1 | 5 |
| Sunray plate (avg. of 2 plates) | 1 | 5 |

TABLE II

Iridescence of glassware substrates washed 50 cycles with powder products:

| Substrate | Powder without HZ | Powder with 0.1% HZ |
|---|---|---|
| English Hi-Ball (avg. 3 glasses) | 4 | 4 |
| B. Valley Wine (avg. 3 glasses) | 5 | 5 |
| Luminarc (avg. 3 glasses) | 4 | 5 |
| Sunray plate (avg. of 2 plates) | 4 | 5 |

TABLE III

Iridescence of glassware substrates washed 50 cycles with powder products:

| Substrate | Liquid gel without Zinc hydroxy sulfate | Liquid gel with 0.1% Zinc hydroxy sulfate |
|---|---|---|
| English Hi-Ball (avg. 3 glasses) | 3 | 5 |
| Luminarc (avg. 3 glasses) | 3 | 5 |
| Sunray plate (avg. of 2 plates) | 3 | 5 |

TABLE IV

Etching of glassware substrates washed 100 cycles with liquid gel products:

| Substrate | Liquid Gel without HZ | Liquid Gel with 0.1% HZ |
|---|---|---|
| Libbey 53 (avg. of 4 glasses) | 1.9 | 4.5 |
| B. Valley wine (avg. of 3 glasses) | 1.5 | 4.5 |
| Luminarc (avg. of 3 glasses) | 1 | 4.2 |
| LC Wine (1 glass) | 4 | 5 |

TABLE V

Etching of glassware substrate washed 50 cycles with powder products:

| Substrate | Powder without HZ | Powder with 0.1% HZ |
|---|---|---|
| English Hi-Ball (avg. 3 glasses) | 2.5 | 3.5 |
| B. Valley Wine (avg. 3 glasses) | 4.3 | 4.8 |
| Luminarc (avg. 3 glasses) | 2.3 | 3.8 |
| Pooh Juice Glass (1 glass) | 2.5 | 3.5 |

TABLE VI

Etching of glassware substrate washed 50 cycles with liquid gel:

| Substrate | Liquid Gel without Zinc Hydroxy Sulfate | Liquid gel with 0.1% Zinc Hydroxy Sulfate |
|---|---|---|
| English Hi-Ball (avg. 3 glasses) | 2 | 3.3 |
| Luminarc (avg. 3 glasses) | 2.3 | 3.7 |

TABLE VII

Etching grades for addition of different amounts of Hydrozincites

| Substrate | Liquid Gel without HZ | Liquid Gel with 0.1% HZ | Liquid Gel with 0.15% HZ | Liquid Gel with 0.5% HZ | Liquid Gel with 1% HZ |
|---|---|---|---|---|---|
| Libbey 53 (avg. of 4 glasses) | 4 | 4.5 | 4.5 | 4.5 | 4.5 |
| Hi-Ball (avg. of 3 glasses) | 3 | 4.2 | 4.3 | 4.8 | 4.7 |
| Luminarc (avg. of 3 glasses) | 2 | 4.3 | 4.3 | 4.5 | 4.8 |

It is observed that even a small amount of ZCLM (e.g. 0.1% HZ and/or 0.1% zinc hydroxy sulfate) is sufficient to aid in maintaining iridescence and also enables substantial anti-etching benefits to treated glassware surfaces. The addition of 0.1% HZ in the Liquid Gel detergent provides about 7 ppm active $Zn^{2+}$ ions in the wash liquor.

TABLE VIII

Zinc Deposition on Glassware Surfaces in the presence of Hydrozincite

| Substrate | # of cycles | Liquid Gel without HZ Zn | Liquid Gel without HZ Si | Liquid Gel with 0.25% HZ Zn | Liquid Gel with 0.25% HZ Si |
|---|---|---|---|---|---|
| Libbey 53 (avg. of 4 glasses) | 1 | 0.12 | 23.30 | 0.51 | 25.23 |
| Hi-Ball (avg. of 3 glasses) | 20 | 0.12 | 21.82 | 0.34 | 22.07 |
| Luminarc (avg. of 3 glasses) | 50 | 0.18 | 21.84 | 0.47 | 19.75 |

It is also observed that the addition of a small amount of ZCLM (e.g. 0.25% HZ) in the formulation results in substantial zinc compound or $Zn^{2+}$ ion deposition on glassware surfaces. In this test, it is also observed that the amount of zinc compounds or $Zn^{2+}$ ions deposited on the glassware surface does not correlate with the number of wash cycles. While not wishing to be bound by theory, the fact that zinc compounds or $Zn^{2+}$ ions do not appear to build up on the glassware surface might indicate that a portion of the zinc compounds or $Zn^{2+}$ ions initially deposited on the glassware surface are washed off and subsequently replenished by rewashing. Angle resolved XPS results (not shown) indicate that the zinc compounds or $Zn^{2+}$ ions are layered on or incorporated within the treated glassware surface. It also appears that the zinc compounds or $Zn^{2+}$ ions are substantially homogeneous within the first 10 nm of the glassware surface after the wash cycle.

Crystalline Integrity Test

The crystalline integrity test is an indirect measure of ZCLM particle crystallinity. The FWHM (full width half maximum) of reflections of an x-ray diffraction (XRD) pattern is a measure of crystalline imperfections and is a combination of instrumental and physical factors. With instruments of similar resolution, one can relate crystal imperfections or crystalline integrity to the FWHM of the peaks that are sensitive to the paracrystalline property. Following that approach, crystalline distortions/perfection are assigned to various ZCLM samples.

Three peaks (200, ~13° 2θ, 6.9 Å; 111, ~22° 2θ, 4.0 Å; 510, 36° 2θ, 2.5 Å) are found to be sensitive to lattice distortion, the 200 reflection is selected for the analysis. The peaks are individually profile-fitted using normal Pearson VII and Pseudo-Voigt algorithms in Jade 6.1 software by MDI. Each peak is profile fitted 10 times with changes in background definition and algorithm to obtain average FWHM with standard deviations. The test results are summarized in Table IX.

TABLE IX

| | Crystallinity | | |
|---|---|---|---|
| | 200 Peak Reflection | | Relative Zinc |
| Sample | FWHM | Std. Dev. | Lability (%) |
| Brüggemann Zinc Carbonate | 0.8625 | 0.0056 | 56.9 |
| Elementis Zinc Carbonate | 0.7054 | 0.0024 | 51.6 |
| Cater Zinc Carbonate#1 | 0.4982 | 0.0023 | 42.3 |

The crystallinity appears to be related to the FWHM of its source. Not wishing to be bound by theory, it is postulated that a lower crystallinity may aid in maximizing zinc lability.

Strengthening Test

FIG. 2 represents a comparison of glassware surface strength using specular reflection IR (IRRAS—Infrared reflection absorption spectroscopy). The substrate, a glass microscopic slide, is washed with commonly available detergent compositions using the same washing conditions as described above in the etching test. The microscopic slide spectra is collected as % transmittance spectra on a Digilab instrument (Bio-Rad) with a background collected of the alignment mirror supplied with the SplitPea accessory (Harrick Scientific Instruments), using a low angle of incidence for it's specular reflectance. Thus, the resulting spectra is a reflectance spectra.

Strengthening of the glassware surface structure is correlated to IR spectral changes in the Si—O stretching vibration region. While not wishing to be bound by theory, it is believed that the reduction on the Si—O stretching vibration at 1050 cm−1 and above in the spectrum of glass treated with a liquid gel detergent composition containing a small amount of a ZCLM (e.g. 0.1%–1% HZ) can be attributed to the increase in roughness which is indicative of glassware surface strength, and to a decrease in the number of bridging Si—O bonds in the bulk glass which is indicative of glassware surface damage.

Little or no damage (i.e. higher strength) to glassware surfaces is observed in glassware surface treated with a liquid gel detergent composition having a small amount of a ZCLM (e.g. 0.1%–1% HZ) versus a liquid gel detergent composition without ZCLM after 50 cycles. Since the addition of a ZCLM to the liquid gel detergent composition leaves treated glassware surface IRRAS results unchanged (i.e. no glassware surface damage), increased glassware surface strength is postulated.

With reference to the polymers described herein, the term weight-average molecular weight is the weight-average molecular weight as determined using gel permeation chromatography according to the protocol found in Colloids and Surfaces A. Physico Chemical & Engineering Aspects, Vol. 162, 2000, pg. 107–121. The units are Daltons.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

It should be understood that every maximum numerical limitation given throughout this specification would include every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

While particular embodiments of the subject invention have been described, it will be obvious to those skilled in the art that various changes and modifications of the subject invention can be made without departing from the spirit and scope of the invention.

It will be clear to those skilled in the art that various changes and modifications may be made without departing from the scope of the invention and the invention is not to be considered limited to the embodiments and examples that are described in the specification.

What is claimed is:

1. A domestic, institutional, industrial, and/or commercial corrosion protection agent for treating glassware surfaces in an aqueous wash liquor, said corrosion protection agent comprising:
   a) an effective amount of a zinc-containing layered material, said material having a particle size in the range of about 1 nm to about 100 nm and a crystallinity value of from about 0.4 to about 0.8625 FWHM units, at a 200 reflection peak; and
   b) a dispersant polymer selected from the group consisting of polyaspartate, starches, celluloses and alginates, wherein said aqueous wash liquor has a pH of from greater than 9 to about 14.

2. A corrosion protection agent according to claim 1 wherein said zinc-containing layered material comprises one or more of the following: basic zinc carbonate, copper zinc carbonate hydroxide, hydroxy double salts where the metal is solely zinc, phyllosilicate containing $Zn^{2+}$ ions, zinc hydroxide acetate, zinc carbonate hydroxide, zinc hydroxide chloride, zinc copper carbonate hydroxide, zinc hydroxide lauryl sulfate, zinc hydroxide nitrate, zinc hydroxide sulfate, and mixtures thereof.

3. A corrosion protection agent according to claim 2 wherein said zinc-containing layered material is zinc carbonate hydroxide having the formula:

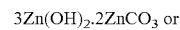

$3Zn(OH)_2 \cdot 2ZnCO_3$ or

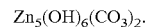

$Zn_5(OH)_6(CO_3)_2$.

4. A corrosion protection agent according to claim 2 wherein said zinc-containing layered material is copper zinc carbonate hydroxide.

5. A corrosion protection agent according to claim 2 wherein said zinc-containing layered material is basic zinc carbonate having the formula:

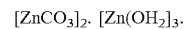

$[ZnCO_3]_2 \cdot [Zn(OH)_2]_3$.

6. A corrosion protection agent according to claim 2 wherein said zinc-containing layered material is zinc hydroxide chloride.

7. A corrosion protection agent according to claim 2 wherein said zinc-containing layered material is zinc hydroxide nitrate.

8. A corrosion protection agent according to claim 2 wherein said zinc-containing layered material is zinc hydroxide sulfate.

9. A corrosion protection agent according to claim 1 wherein said zinc-containing layered material is present from about 0.001% to about 10% by weight of the composition.

10. A corrosion protection agent according to claim 9 wherein said zinc-containing layered material is present from about 0.01% to about 7% by weight of the composition.

* * * * *